United States Patent [19]

Brady

[11] Patent Number: 5,780,746
[45] Date of Patent: Jul. 14, 1998

[54] MINIMUM THICKNESS FORCE SENSOR WITH TEMPERATURE COMPENSATION

[75] Inventor: John F. Brady, Wood Dale, Ill.

[73] Assignee: Fel-Pro Incorporated, Skokie, Ill.

[21] Appl. No.: 695,231

[22] Filed: Aug. 7, 1996

[51] Int. Cl.⁶ .............................. G01L 19/00; G01L 1/22
[52] U.S. Cl. ................................ 73/766; 73/763; 73/777
[58] Field of Search .......................... 73/766, 777, 725, 73/726, 719, 720, 724, 754

[56] References Cited

PUBLICATIONS

P.W. Bridgeman, *The Physis of High Pressure*, pp. 70–77, Bell and Sons, Ltd., London, 1958.
J.W. Kannel and T.A. Dow, "The Evolution of Surface Pressure and Temperature Measurement Techniques for Use in the Study of Lubrication in Metal Rolling," *Journal of Lubrication Technology*, pp. 611–616, Oct. 1974.
Terry L. Merriman, "Transducers and Techniques of Contact Pressure Measurement," undated.
D.D. Keough and J.Y. Wong, "Variation of the Shock Piezoresistance Coefficient of Manganin as a Function of Deformation," *Journal of Applied Physics*, vol. 41, No. 8, pp. 3508–3515, Jul. 1970.
G. Bosca, J. David, L. Allay, J.M. Darmon and Y. Victor, "Piézorésistivité du Manganin et de l'Ytterbium Déposés par Pulvérization Cathodique," undated.
Soviet Union Patent No. 505915, issued May 13, 1976.

*Primary Examiner*—Ronald L Biegel
*Attorney, Agent, or Firm*—Steven P. Shurtz; Brinks Hofer Gilson & Lione

[57] ABSTRACT

A force sensor comprising a substrate, a conductive material providing an electrically discernible response to compressive stress disposed on the substrate, and a thermocouple disposed on the substrate proximate to the conductive material. A measurement processor is also described that includes first means for measuring electrical signals from the conductive material indicative of compressive stress, second means for measuring electrical signals from the thermocouple indicative of temperature in proximity to the conductive material, means for determining a temperature compensating factor derived from the electrical signals indicative of compressive stress and the electrical signals indicative of temperature, and means for determining a temperature compensated compressive stress value derived from the temperature compensating factor and the electrical signals indicative of compressive stress.

29 Claims, 3 Drawing Sheets

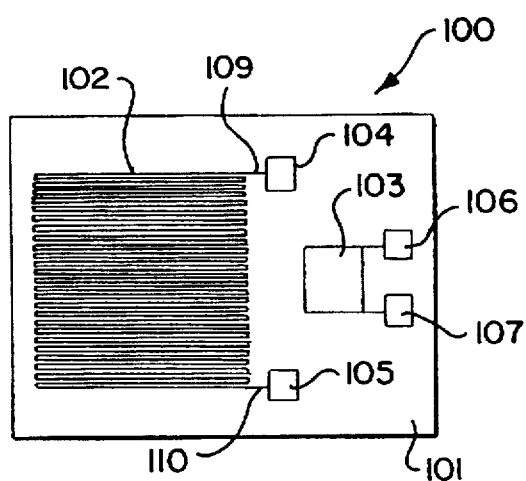
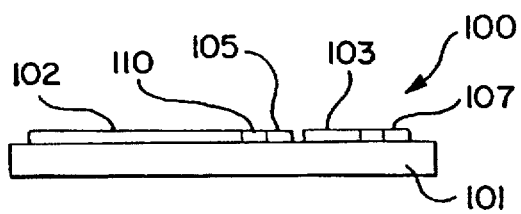
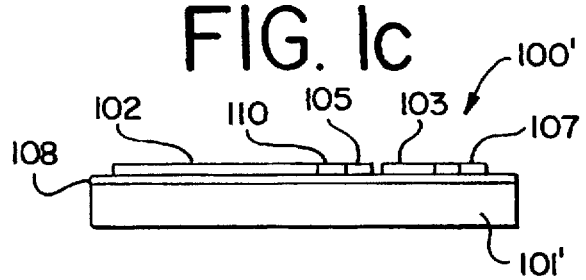
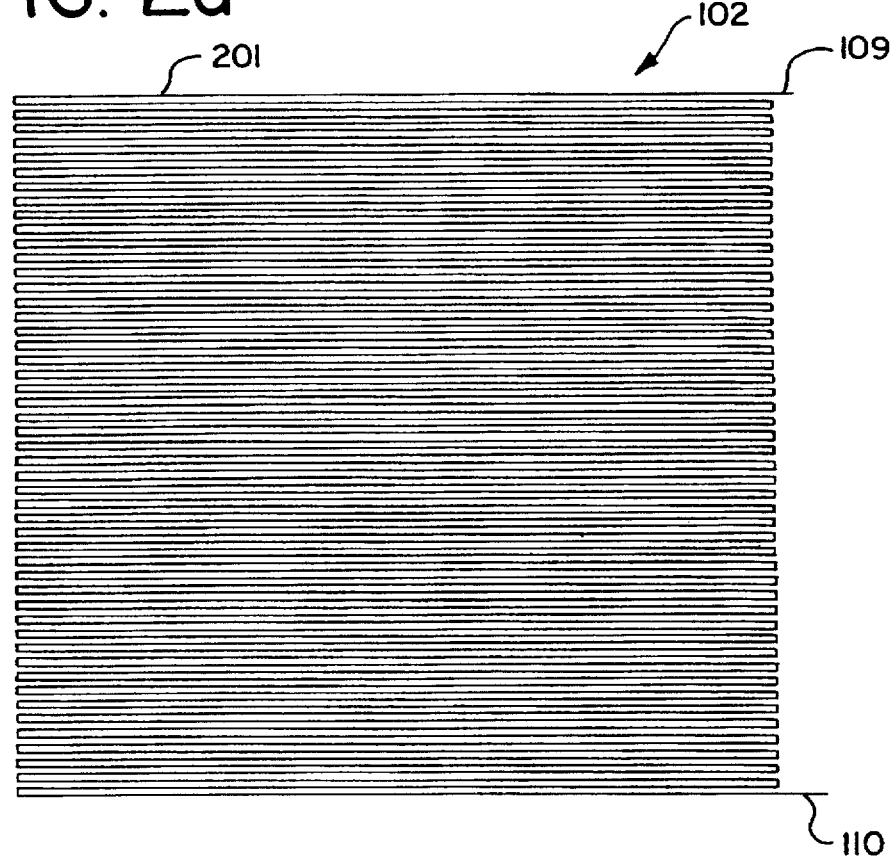
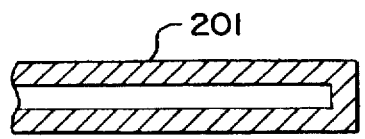

MINIMUM THICKNESS FORCE SENSOR WITH TEMPERATURE COMPENSATION

FIELD OF THE INVENTION

This invention relates generally to force sensors and in particular to force sensors interposed between mating surfaces to measure compressive stress, and is more particularly directed toward a minimum thickness force sensor with temperature compensation.

BACKGROUND OF THE INVENTION

There are many applications in which accurate compressive stress measurements are needed. Many of these applications involve the measurement of compressive stress between mating surfaces.

Oftentimes, in situations where compressive stress between mating surfaces must be accurately measured, the application does not permit the introduction, between the mating surfaces, of a measurement instrument having significant thickness. This is true in applications where at least one of the goals is the achievement of a compressive seal, and the introduction of a sensor or measurement instrument would interfere with that goal.

In internal combustion engines, for example, a compressive seal is normally established between the engine block and the cylinder head, and the introduction of a measurement instrument might compromise the desired seal. Consequently, a compressive stress measurement system for an internal combustion engine must, of necessity, employ a very thin sensor.

The internal combustion engine is also a hostile environment for any measuring system due in large measure to the high temperatures encountered in or near the combustion chambers. Thus, any sensor intended for measurement of compressive stress anywhere near the combustion chamber of an internal combustion engine must be able to withstand high temperatures while still providing reliable measurement information.

Accordingly, a need arises for a force sensor of minimum thickness that can be interposed between mating surfaces with minimal perturbation along the mating plane. In addition, the sensor must be capable of reliable and repeatable operation in hostile environments.

SUMMARY OF THE INVENTION

These needs and others are satisfied by the force sensor of the present invention. The force sensor comprises a substrate, a conductive material providing an electrically discernible response to compressive stress disposed on the substrate, and a thermocouple disposed on the substrate proximate to the conductive material. The substrate may be an electrically conducting material, such as a metal, with an electrically insulating material disposed between the substrate and both the conductive material and the thermocouple. The electrically conducting substrate may have a thermal coefficient of expansion selected to match a thermal coefficient of expansion of the conductive material. The substrate may also be an electrically insulating material, such as a ceramic material, or it may be a plastic sheet, such as a polyimide film, having a thickness of about 0.001 inch.

The conductive material is preferably deposited on the substrate to a thickness of about 2 microns. The conductive material may, for example, be manganin or ytterbium, and may be formed into a relatively narrow conductive trace disposed in a substantially serpentine grid pattern. This substantially serpentine grid pattern may be formed by selective removal or selective addition of conductive material.

The force sensor may further include a carrier plate affixed to the substrate such that the conductive material and the thermocouple are interposed between the substrate and the carrier plate. The thermocouple is preferably a J-type thermocouple formed from iron and constantan, and may be deposited on the substrate by vacuum deposition.

First and second contact pads may be disposed on the substrate, the first and second contact pads providing electrical connection to the conductive material. Third and fourth contact pads may also be disposed on the substrate, the third and fourth contact pads providing electrical connection to the thermocouple.

In the alternative, first and second conductive traces may be disposed on the substrate, the first and second conductive traces providing electrical connection to the conductive material. Third and fourth conductive traces may also be disposed on the substrate, the third and fourth conductive traces providing electrical connection to the thermocouple.

The force sensor may also include a measurement processor electrically connected to the conductive material and to the thermocouple. The measurement processor comprises first means for measuring electrical signals from the conductive material indicative of compressive stress, second means for measuring electrical signals from the thermocouple indicative of temperature in proximity to the conductive material, means for determining a temperature compensating factor derived from the electrical signals indicative of compressive stress and the electrical signals indicative of temperature, and means for determining a temperature compensated compressive stress value derived from the temperature compensating factor and the electrical signals indicative of compressive stress.

The first means for measuring electrical signals may be a Wheatstone bridge circuit, while the means for determining a temperature compensating factor may comprise a look-up table. The force sensor may also include a display that indicates the temperature compensated compressive stress value.

Further objects, features, and advantages of the present invention will become apparent from the following description and drawings.

BRIEF DESCRIPTION OF THE DRAWINGS

FIG. 1a is a top plan view of a temperature compensated compressive stress sensor in accordance with the present invention;

FIG. 1b is a side elevational view of the sensor of FIG. 1a;

FIG. 1c is a side elevational view of another embodiment of the sensor in accordance with the present invention;

FIG. 2a is an enlarged view of a portion of FIG. 1a;

FIG. 2b is a further enlarged view of a portion of FIG. 1a;

DETAILED DESCRIPTION OF THE INVENTION

Figure 3:
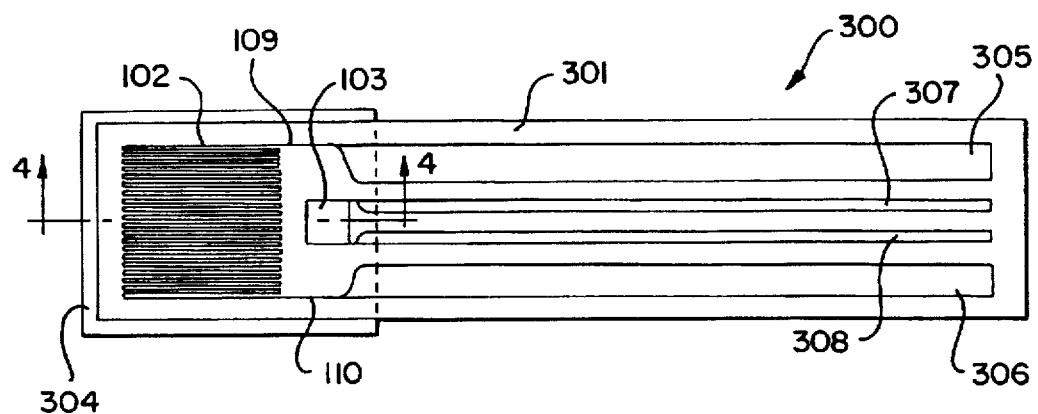
FIG. 3 is a bottom plan view of yet a further embodiment of a temperature compensated compressive stress sensor in accordance with the present invention.

In accordance with the present invention, a minimum thickness force sensor with temperature compensation is described that provides distinct advantages when compared to the prior art. The invention can best be understood with reference to the accompanying drawing figures.

FIGS. 1a and 1b depict a temperature compensated force sensor 100 in accordance with the present invention. A conductive material 102 is deposited on a substrate 101. In one form of the invention, the substrate 101 may be a rigid, electrically insulating material, such as glass or ceramic.

Changes in compressive stress experienced by the conductive material 102 are electrically discernible by virtue of a corresponding change in electrical resistance of the conductive material 102 in a fashion that will now be explained. Thus, the area of conductive material 102 may function as a force or compressive stress sensor.

It is known that electrical resistance of a conductor can be altered by subjecting the conductor to compressive stress. Such changes in electrical resistance are generally predictable, stable, and repeatable, but the changes are also quite small. Materials that are known to display this predictable, stable, and repeatable resistance variation are the element ytterbium and the alloy manganin, although there are other conductive materials that also exhibit this phenomenon.

Manganin, as is well-known, is an alloy of nickel, copper, and manganese, with the specific composition having at least some effect on its compressive stress versus electrical resistance performance. The approximate proportions of manganin's constituent elements are: about 80 percent copper; 15 percent manganese; and 5 percent nickel; although the composition of commercially available manganin may vary slightly from the above. Manganin is particularly well suited for compressive stress measurement applications because it is relatively inexpensive and comparatively easy to work with.

In the preferred embodiment, the conductive material 102 is deposited on the substrate 101 using known techniques, such as screen printing, sputtering, electroplating, or vacuum deposition, and the overall thickness of the deposited material is preferably on the order of 2 microns. Of course, other thicknesses may be used, although the thinner the material, the thinner the completed sensor's profile will be. This is consistent with the overall goal to minimize disturbance along the mating plane of surfaces between which the completed sensor may be designed to function.

Preferably, at least a portion of the deposited conductive material 102 is selectively removed to yield a relatively thin conductive trace 201 arranged in a substantially serpentine grid-like pattern, as illustrated in FIGS. 2a and 2b. This selective removal process may be accomplished using known methods, such as photo-etching, laser trimming, and mechanical cutting tools, among others. Of course, the grid-like pattern could also be introduced using selective addition processes such as printing, plating, or sputtering, among others.

The meandering arrangement of the relatively thin conductive trace 201 is preferred, since this arrangement increases the overall electrical resistance of the sensor. This is useful to limit power consumption in the sensor system, and to minimize local heating of the sensor 102 that may affect measurement accuracy.

In this embodiment of the invention, the insulating substrate 101 (FIG. 1a) may be formed from a ceramic material having a thickness of about 0.001 inch. The thickness of the substrate 101 may be increased where structural integrity is a concern, keeping in mind that the overall structure should be thin to minimize perturbation along the sealing plane where the sensor may be installed. Increasing the thickness of the substrate 101 provides the additional advantage of minimizing adverse temperature expansion interaction between the conductive material 102 and the substrate 101.

In order to provide electrical connection between the conductive material 102 and external measurement electronics, electrical contact pads 104, 105 are provided on the substrate 101 to which wires may be soldered. The contact pads 104, 105 may also be applied to the substrate 101 using the deposition techniques described above with reference to the conductive material 102, as may conductive traces 109, 110 that make electrical contact between the conductive material 102 and the contact pads 104, 105.

A thermocouple 103 is also disposed on the substrate 101. The thermocouple 103 may also be deposited on the substrate 101 using known deposition techniques, such as vacuum deposition. The thermocouple is preferably a J-Type thermocouple fabricated from a combination of iron and constantan (an alloy of copper and nickel), and is positioned in proximity to the conductive material 102.

The thermocouple 103, as is well-known, develops an electrical potential difference that is dependent upon its temperature. Because of the proximity of the thermocouple 103 to the conductive material 102, the thermocouple temperature is a good indication of the operating temperature of the conductive material 102. External electrical connection for the thermocouple 103 may be provided through electrical contact pads 106, 107 deposited on the substrate 101. The contact pads 104–107 act as electrical contacts through with electrical connection may be made to the conductive material 102 and the thermocouple 103.

In one example of operation, the completed sensor 100 (or a number of such sensors) may be embedded in appropriate gasket material and installed between mating portions of an internal combustion engine. For other applications, it may be necessary to provide a layer of insulating material over the conductive material 102 and the thermocouple 103, although this use of an insulating layer is not shown.

FIG. 1c illustrates an alternative embodiment of a sensor 100' in which a metal substrate 101' is employed, rather than a nonconductive substrate as described above. The thermal coefficient of expansion of the metal substrate 101' is preferably selected to match that of the conductive material 102, thus minimizing measurement errors that might arise as a result of thermal stress.

An insulating layer 108 covers the substrate 101' and prevents electrical shorts between the conductive material 102 and the substrate 101', as well as between the thermocouple 103 and the substrate 101'. Of course, instead of completely covering a surface of the substrate 101', the insulating material 108 could be selectively deposited on the substrate 101' only in those regions where it is really needed.

Figure 4:
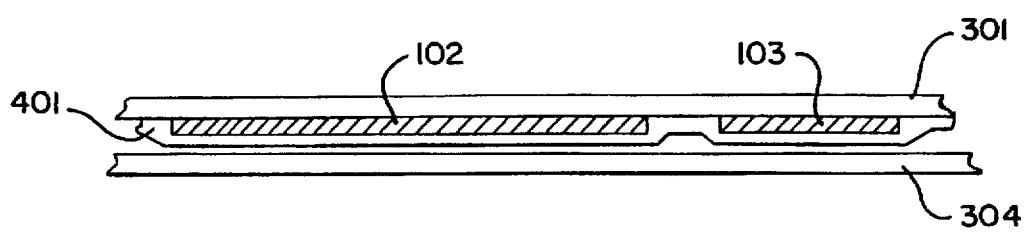
FIG. 4 is a partial section view along section lines 4—4 of FIG. 3.

FIGS. 3 and 4 depict yet another embodiment of a temperature compensated force sensor 300 in accordance with the present invention. The conductive material 102 is disposed on a thin insulative sheet or substrate 301.

In order to maximize structural integrity of the completed sensor 300, a carrier plate 304 is affixed to the substrate 301. Once again, maintaining a relatively thin sensor profile is important in many sensor applications, so the carrier plate 304 is preferably a 0.001 inch thick plate formed from full hard stainless steel. Of course, other materials and thicknesses may be appropriate as well, depending upon the application.

A layer of electrically insulating material 401 is interposed between the carrier plate 304 and the substrate 301, such that the conductive material 102 and a thermocouple 103 are insulated from electrical contact with the carrier plate 304. The electrically insulating material 401 may be a vacuum deposited film of PTFE (polytetrafluoroethylene), such as Teflon, having a thickness on the order of 1 micron.

The insulative substrate 301 may be a relatively thin plastic sheet material, on the order of 0.001 inch in thickness. Once again, thickness of the substrate should be minimized to reduce its impact on overall sensor thickness. Preferably, the substrate is formed of Kapton, a polyimide film available from DuPont Company. The substrate 301 of FIG. 3 may be relatively transparent, so that details of the conductive material 102 and the thermocouple 103 may be visible through the substrate 301 when that is desired.

In order to provide electrical connections to the conductive material 102 and the thermocouple 103, conductive traces 305–308 are deposited on the substrate 301. First and second conductive traces 305–306 make electrical contact with extended portions 109–110 of the serpentine conductive trace 201 of the conductive material 102. Third and fourth conductive traces 307–308 provide electrical contact with the thermocouple 103. These conductive traces 305–306 may be deposited on the substrate 301 using any of the known deposition techniques, including vacuum deposition, screen printing of conductive ink, etc. The conductive traces 305–308 may terminate in electrical contacts through which electrical connection may be made to the conductive material 102 and the thermocouple 103.

Knowledge of the operating temperature of the conductive material 102 permits compressive stress measurements to be compensated for changes in operating temperature, and ensures measurement accuracy even in environments having sharply elevated temperatures, such as near the combustion chamber of an internal combustion engine.

Generally, the effect of temperature on the resistance of conductive materials such as manganin is relatively small. The effect must be taken into account, however, to preserve measurement accuracy at very high temperatures. In addition, because of the preferred implementation of the sensor system, temperature effects become even more important.

As has been noted, the conductive material 102 is formed into a conductive trace 201 arranged in a substantially serpentine configuration. The winding disposition of the trace 201 along the substrate permits the conductive material to have relatively high electrical resistance, on the order of 2000 to 3000 ohms. While this high resistance value results in the desirable effect of minimizing power consumption and local thermal effects due to heating of the conductive material 102, the high sensor resistance also means that changes in sensor current or voltage in response to changes in compressive stress will be small, and fluctuations due to temperature effects will have a greater effect on system accuracy.

Figure 5:
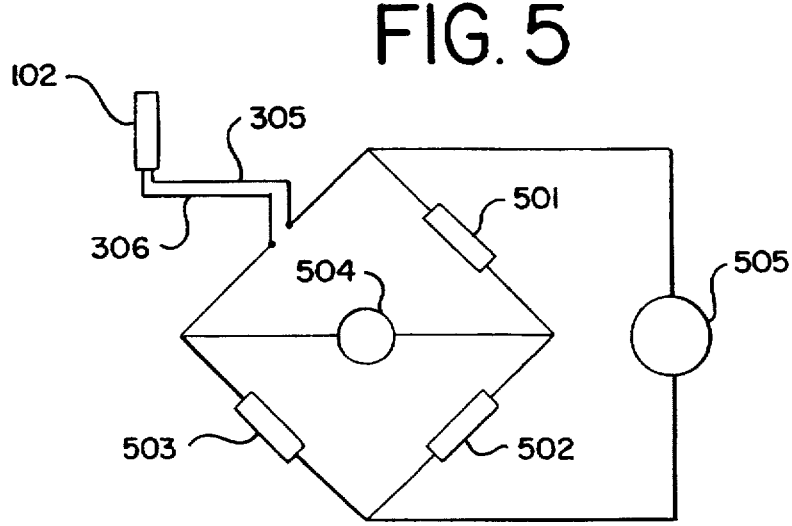
FIG. 5 is a schematic representation of a Wheatstone bridge circuit.

Since changes in resistance of the conductive material 102 corresponding to changes in compressive stress are relatively small, a sensitive and accurate measurement instrument should be employed to detect these changes. In the preferred embodiment of the invention, the measurement instrument is a Wheatstone bridge circuit, as illustrated in FIG. 5.

As is well-known, the Wheatstone bridge preferably employs a plurality of resistors 501–503 connected in a bridge configuration as shown with an unknown resistance value, such as the conductive material 102 used as a compressive stress sensor. In situations, such as here, where the unknown value is expected to vary only slightly, and its approximate initial resistance is known, the remaining resistors 501–503 are all selected to have approximately the same value as the initial value of the resistance to be measured. For example, if the serpentine conductive material pattern 102 has an initial resistance of 3000 ohms, then the values of the remaining resistors 501–503 are selected to be 3000 ohms as well.

When a source of electrical potential 505 is applied to the bridge, and the resistance of the conductive material is, like the remaining resistors 501–503, 3000 ohms, the bridge is said to be balanced. In a balanced condition, no voltage drop will be observed by a sensitive measuring instrument (such as a galvanometer 504) connected across the bridge.

As compressive stress causes the resistance of the conductive material 102 to change, however, the bridge becomes unbalanced, and a measurable voltage may then be sensed by the measuring instrument 504. In the preferred embodiment, the voltage source 505 has a value of about 12 volts, since this voltage is conveniently supplied by a vehicle battery. Of course, other voltages could also be used.

Figure 6:
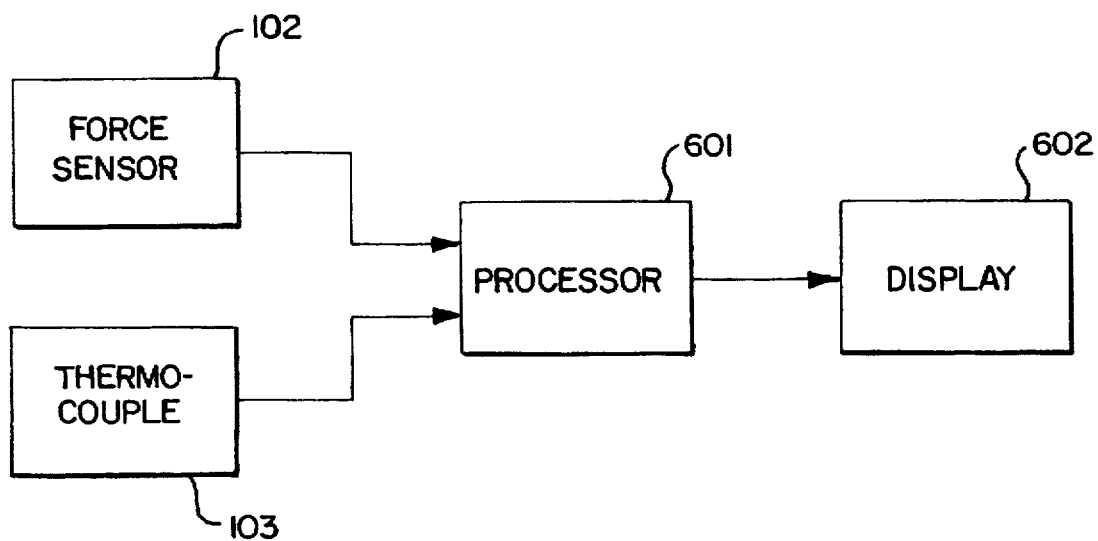
FIG. 6 depicts a compressive stress measurement system, in accordance with the present invention, in block diagram form.

In a complete measurement system, as shown in FIG. 6, both the conductive material 102 used as a force or compressive stress sensor and the thermocouple 103 are electrically connected via conductive traces (305–308 of FIG. 3, for example) or by wires soldered to contact pads (104–107 of FIG. 1a, for example) to a measurement processor 601. The measurement processor 601 includes first means for measuring electrical signals from the conductive material 102 that are indicative of compressive stress. This first means for measuring electrical signals may be a Wheatstone bridge circuit as just described.

Figure 7:
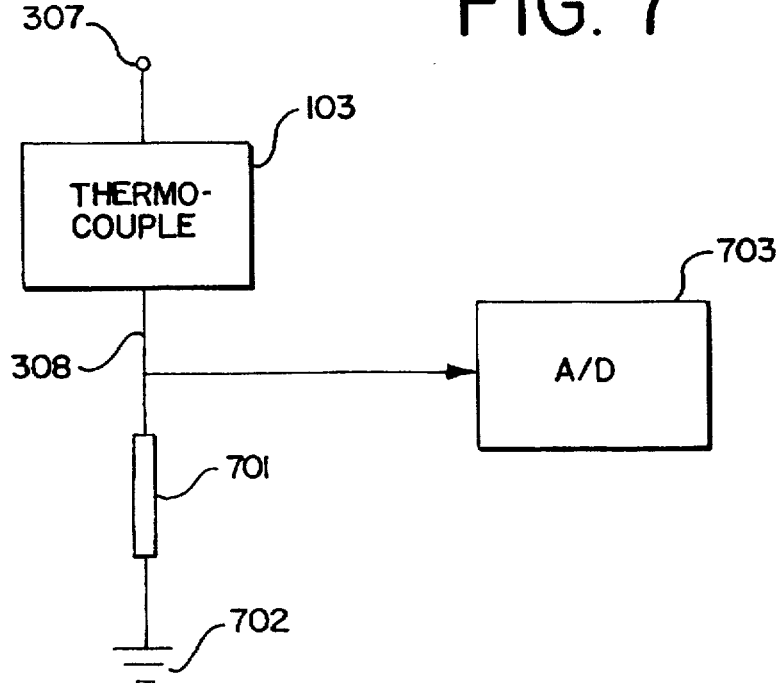
FIG. 7 is a block diagram of a temperature measurement circuit.

The measurement processor 601 also includes second means for measuring electrical signals from the thermocouple 103 indicative of temperature in proximity to the conductive material 102. This second means for measuring electrical signals may be an analog-to-digital (A/D) converter 701, as shown in FIG. 7. With a voltage source connected to one of the conductive traces 307 (or to contact pad 106 in the embodiment of FIG. 1a) leading to the thermocouple 103 and a resistor 701 of suitable value connected to the other conductive trace 308 (or the other contact pad 107) to the thermocouple 103, an A/D converter 701 can then measure the voltage across the resistor 701. This voltage will be indicative of thermocouple temperature.

In order to compensate the electrical signals indicative of compressive stress received from the conductive material 102, the measurement processor 601 may implement a simple table look-up technique known in the art, in which compensating factors corresponding to selected temperatures are stored in a memory device, such as a ROM (read only memory), and are added or subtracted, as appropriate, from the raw compressive stress value corresponding to the electrical signals received from the conductive material 102.

Of course, a measurement processor as described may easily be implemented with a microprocessor, using well-known techniques, or by other known methods. In order to furnish an observer with an accurate indication of compressive stress, the measurement system may also incorporate a display 602 coupled to the measurement processor. The display may be an LED (light emitting diode) type, an LCD (liquid crystal display) or other suitable display variety.

There has been described herein a minimum thickness force sensor with temperature compensation that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A force sensor comprising:
   a substrate;
   a conductive material providing an electrically discernible response to compressive stress disposed on the substrate; and
   a thermocouple disposed on the substrate proximate to the conductive material, and wherein the substrate is an electrically conducting material, and electrically insulating material is interposed between the substrate and both the conductive material and the thermocouple, and wherein the electrically conductive substrate has a thermal coefficient of expansion selected to match a thermal coefficient of expansion of the conductive material.

2. The force sensor of claim 1, wherein the conductive material is deposited on the substrate to a thickness of about 2 microns.

3. The force sensor of claim 2, wherein the conductive material is manganin.

4. The force sensor of claim 2, wherein the conductive material is ytterbium.

5. The force sensor of claim 2, wherein the conductive material is formed in a relatively narrow conductive trace disposed in a substantially serpentine grid pattern.

6. The force sensor of claim 1, wherein the thermocouple is a J-type thermocouple formed from iron and constantan.

7. The force sensor of claim 6, wherein the thermocouple is deposited on the substrate by vacuum deposition.

8. The force sensor of claim 1, further comprising a measurement processor electrically connected to the conductive material and to the thermocouple.

9. The force sensor of claim 8, wherein the measurement processor comprises:
   first means for measuring electrical signals from the conductive material indicative of compressive stress;
   second means for measuring electrical signals from the thermocouple indicative of temperature in proximity to the conductive material;
   means for determining a temperature compensating factor derived from the electrical signals indicative of compressive stress and the electrical signals indicative of temperature; and
   means for determining a temperature compensated compressive stress value derived from the temperature compensating factor and the electrical signals indicative of compressive stress.

10. The force sensor of claim 9, wherein the first means for measuring electrical signals compresses a Wheatstone bridge circuit.

11. The force sensor of claim 9, wherein the means for determining a temperature compensating factor comprises a look-up table.

12. The force sensor of claim 9, further comprising a display that indicates the temperature compensated compressive stress values.

13. A temperature compensated force sensor comprising:
    a substrate;
    a conductive material deposited on the substrate as a relatively narrow conductive trace in a substantially serpentine grid pattern, the conductive material providing an electrically discernible response to compressive stress; and
    a thermocouple disposed on the substrate proximate to the conductive material;
    first and second electrical contacts disposed on the substrate, the first and second electrical contacts providing electrical connection to the conductive material; and
    third and fourth electrical contacts disposed on the substrate, the third and fourth electrical contacts providing electrical connection to the thermocouple, and wherein the substrate is an electrically conducting material, and electrically insulating material is interposed between the substrate and both the conductive material and the thermocouple, and wherein the electrically conductive substrate has a thermal coefficient of expansion selected to match a thermal coefficient of expansion of the conductive material.

14. The temperature compensated force sensor of claim 13, further comprising a measurement processor electrically connected to the conductive material and to the thermocouple.

15. The temperature compensated force sensor of claim 14, wherein the measurement processor comprises:
    first means for measuring electrical signals from the conductive material indicative of compressive stress;
    second means for measuring electrical signals from the thermocouple indicative of temperature in proximity to the conductive material;
    means for determining a temperature compensating factor derived from the electrical signals indicative of compressive stress and the electrical signals indicative of temperature; and
    means for determining a temperature compensated compressive stress value derived from the temperature compensating factor and the electrical signals indicative of compressive stress.

16. The temperature compensated force sensor of claim 15, wherein the first means for measuring electrical signals comprises a Wheatstone bridge circuit.

17. The temperature compensated force sensor of claim 15, wherein the means for determining a temperature compensating factor comprises a look-up table.

18. The temperature compensated force sensor of claim 15, further comprising a display that indicated the temperature compensated compressive stress value.

19. A temperature compensated compressive stress measurement system comprising:
    a substrate;
    a conductive material deposited on the substrate as a relatively narrow conductive trace in a substantially serpentine grid pattern, the conductive material providing an electrically discernible response to compressive stress;
    a thermocouple disposed on the substrate proximate to the conductive material;
    first and second electrical contacts disposed on the substrate, the first and second electrical contacts providing electrical connection to the conductive material; and
    third and fourth electrical contacts disposed on the substrate, the third and fourth electrical contacts providing electrical connection to the thermocouple;
    a measurement processor electrically connected to the conductive material through the first and second electrical contacts, and to the thermocouple through the third and fourth electrical contacts, wherein the measurement processor includes:

first means for measuring electrical signals from the conductive material indicative of compressive stress;

second means for measuring electrical signals from the thermocouple indicative of temperature in proximity to the conductive material;

means for determining a temperature compensating factor derived from the electrical signals indicative of compressive stress and the electrical signals indicative of temperature; and means for determining a temperature compensated compressive stress value derived from the temperature compensating factor and the electrical signals indicative of compressive stress; and wherein the substrate is an electrically conducting material, and an electrically insulating material is interposed between the substrate and both the conductive material and the thermocouple, and wherein the electrically conductive substrate has a thermal coefficient of expansion selected to match a thermal coefficient of expansion of the conductive material.

20. A force sensor comprising:

a substrate;

a conductive material providing an electrically discernible response to compressive stress disposed on the substrate; and a thermocouple disposed on the substrate proximate to the conductive material, and wherein the substrate is an electrically insulating material, and wherein the electrically insulating material is ceramic.

21. A force sensor comprising:

a substrate;

a conductive material providing an electrically discernible response to compressive stress disposed on the substrate; and a thermocouple disposed on the substrate proximate to the conductive material, and wherein the conductive material is deposited on the substrate to a thickness of about 2 microns, said conductive material being formed in a relatively narrow conductive trace disposed in a substantially serpentine grid pattern, said serpentine grid pattern being formed by selective removal of at least a portion of the conductive material.

22. A force sensor comprising:

a substrate; and a conductive material providing an electrically discernible response to compressive stress disposed on the substrate;

a thermocouple disposed on the substrate proximate to the conductive material, and wherein the conductive material is deposited on the substrate to a thickness of about 2 microns, said conductive material being formed in a relatively narrow conductive trace disposed in a substantially serpentine grid pattern, said serpentine grid pattern being formed by selective addition of conductive material.

23. A force sensor comprising:

a substrate;

a conductive material providing an electrically discernible response to compressive stress disposed on the substrate; and a thermocouple disposed on the substrate proximate to the conductive material, and wherein the substrate comprises a plastic sheet, and further comprising a carrier plate affixed to the substrate such that the conductive material and the thermocouple are interposed between the substrate and the carrier plate.

24. The force sensor of claim 23, wherein an electrically insulating material is interposed between the carrier plate and both the conductive material and the thermocouple.

25. A force sensor comprising:

a substrate; and a conductive material providing an electrically discernible response to compressive stress disposed on the substrate;

a thermocouple disposed on the substrate proximate to the conductive material, and wherein the conductive material is deposited on the substrate to a thickness of about 2 microns, said conductive material being formed in a relatively narrow conductive trace disposed in a substantially serpentine grid pattern, and wherein first and second contact pads are disposed on the substrate, the first and second contact pads providing electrical connection to the conductive material.

26. The force sensor of claim 25, wherein third and fourth contact pads are disposed on the substrate, the third and fourth contact pads providing electrical connection to the thermocouple.

27. A force sensor comprising:

a substrate;

a conductive material providing an electrically discernible response to compressive stress disposed on the substrate; and a thermocouple disposed on the substrate proximate to the conductive material, and wherein the substrate comprising a plastic sheet, and further comprising a carrier plate affixed to the substrate such that the conductive material and the thermocouple are interposed between the substrate and the carrier plate, and wherein an electrically insulating material is interposed between the carrier plate and both the conductive material and the thermocouple, wherein first and second conductive traces are disposed on the substrate, the first and second conductive traces providing electrical connection to the conductive material.

28. The force sensor of claim 27, wherein third and fourth conductive traces are disposed on the substrate, the third and fourth conducive traces providing electrical connection to the thermocouple.

29. A force sensor comprising:

a substrate;

a conductive material providing an electrically discernible response to compressive stress disposed on the substrate; and a thermocouple disposed on the substrate proximate to the conductive material, wherein the substrate comprises a plastic sheet of a polyimide film having a thickness of about 0.001 inch.

* * * * *

UNITED STATES PATENT AND TRADEMARK OFFICE
CERTIFICATE OF CORRECTION

PATENT NO. : 5,780,746
DATED : July 14, 1998
INVENTOR(S) : John F. Brady

It is certified that error appears in the above-identified patent and that said Letters Patent is hereby corrected as shown below:

In the Claims

In claim 10, line 2, please change "compresses" to --comprises--.

In claim 12, line 3, please change "values" to --value--.

In claim 18, line 2, please change "indicated" to --indicates--.

In claim 22, line 2, please delete "and".

In claim 22, line 5, please insert --and-- at the end of the line.

Signed and Sealed this

Seventeenth Day of April, 2001

Attest:

NICHOLAS P. GODICI

*Attesting Officer*  *Acting Director of the United States Patent and Trademark Office*